Aug. 22, 1939.　　M. MARTELLOTTI ET AL　　2,170,503

MILLING MACHINE

Filed Nov. 22, 1937　　5 Sheets-Sheet 1

INVENTORS
MARIO MARTELLOTTI
HANS ERNST
BY
　　Parsons
ATTORNEY.

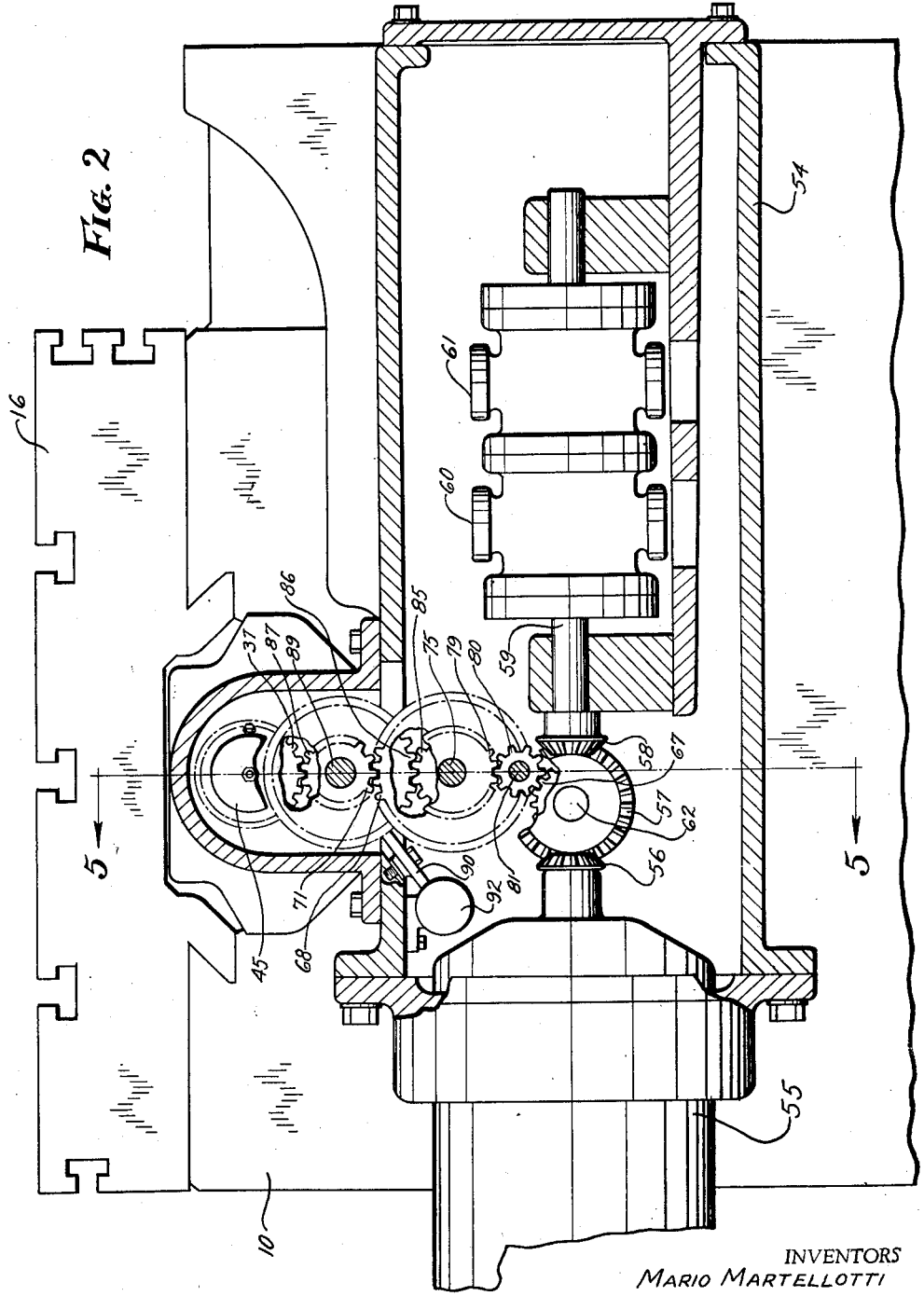

Aug. 22, 1939. M. MARTELLOTTI ET AL 2,170,503
MILLING MACHINE
Filed Nov. 22, 1937 5 Sheets-Sheet 3
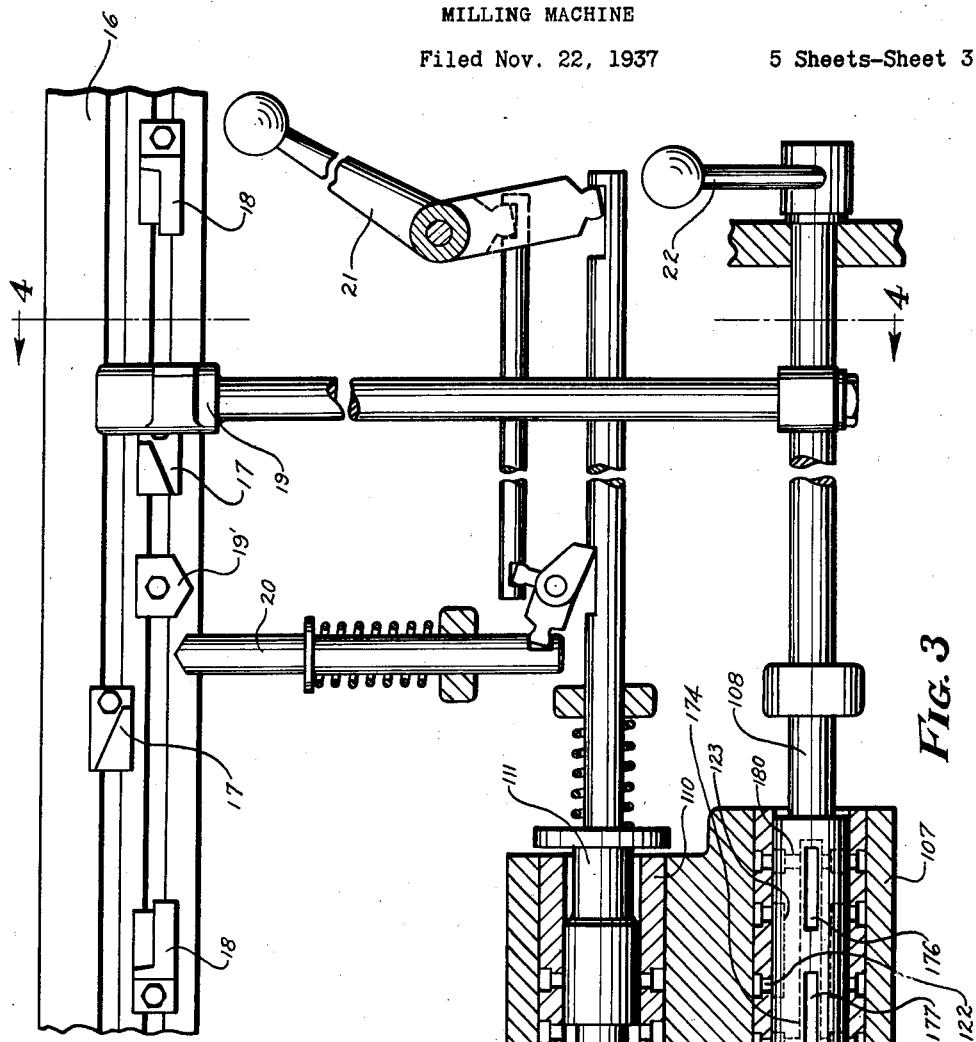
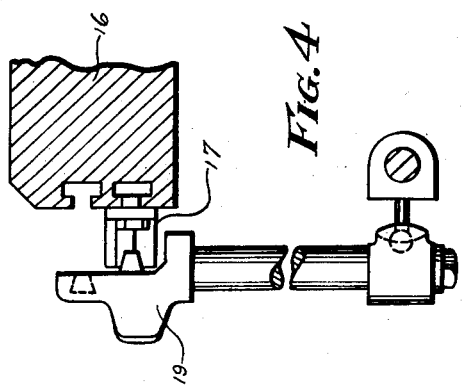
INVENTORS
MARIO MARTELLOTTI
HANS ERNST
BY
A. H. Parsons
ATTORNEY.

Aug. 22, 1939.  M. MARTELLOTTI ET AL  2,170,503
MILLING MACHINE
Filed Nov. 22, 1937     5 Sheets-Sheet 4

INVENTORS
MARIO MARTELLOTTI
HANS ERNST
BY
*A. H. Parsons*
ATTORNEY.

Aug. 22, 1939.   M. MARTELLOTTI ET AL   2,170,503
MILLING MACHINE
Filed Nov. 22, 1937   5 Sheets-Sheet 5

INVENTORS
MARIO MARTELLOTTI
HANS ERNST
BY
*OHH Parsons*
ATTORNEY.

Patented Aug. 22, 1939

2,170,503

UNITED STATES PATENT OFFICE 2,170,503

MILLING MACHINE

Mario Martellotti and Hans Ernst, Cincinnati, Ohio, assignors to The Cincinnati Milling Machine Co., Cincinnati, Ohio, a corporation of Ohio Application November 22, 1937, Serial No. 175,804

11 Claims. (Cl. 90—21.5)

This invention relates to improvements in milling machines and has particular reference to the mechanism for control of relative translatory movement of the shiftable elements thereof.

One of the principal objects of the present invention is the provision of an improved table transmission or the like which shall be equally efficient in positive control of the translatory movement during cutting, both with and against the direction of feed.

A further object of the present invention is the provision of an improved combined hydromechanical control for translation of a milling machine or other machine tool which shall effect a controlled relative movement of the parts during both feeding and rapid traverse.

An additional object of the present invention is the provision of a mechanism which will insure a satisfactory locking of the parts, eliminating backlash or lost motion conditions, both during translation and when the same are at rest.

An additional object of the present invention is the provision in conjunction with an automatic hydro-mechanical table shifting mechanism of the character indicated of simplified supplemental means for effecting ready manual relative adjustment of the parts.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 2 is a transverse sectional view as on the line 2—2 of Figure 1.

Figure 3 is an enlarged semi-sectional view illustrating the trip control mechanism and valve devices associated therewith.

Figure 4 is a fragmentary sectional view as on the line 4—4 of Figure 3.

Figure 1:
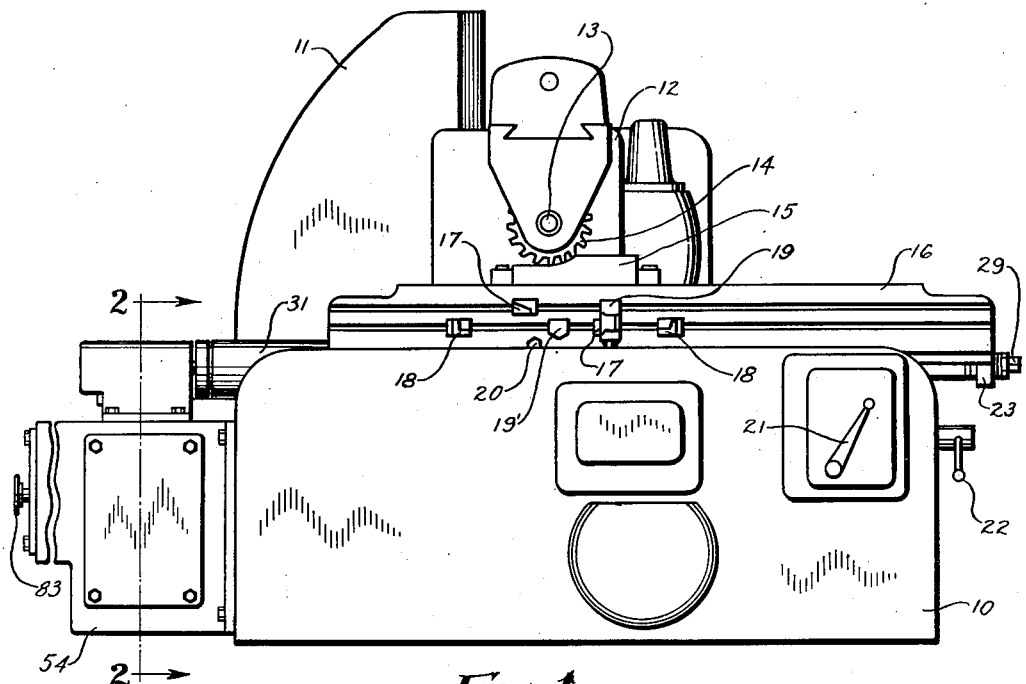
Figure 1 is a front elevation of a machine embodying the present improvements.
Figure 7:
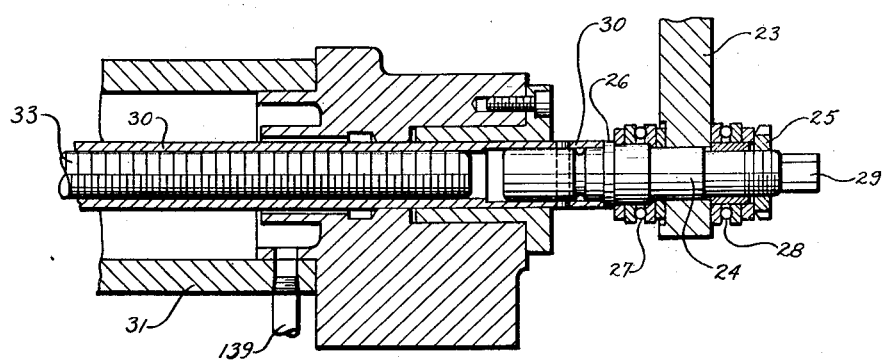
Figure 7 is a corresponding view of the opposite end of the cylinder showing the drive connection to the translatable table.

In the drawings in which similar characters of reference are employed to denote similar parts throughout, the several views, the numeral 10 designates the bed of a milling machine shown as having rising therefrom the column 11 supporting the spindle carrier 12 bearing a suitable spindle 13 for the cutter 14 which may be rotated in either clockwise or counterclockwise direction. In Figure 1 it has been illustrated as mounted for operation in a clockwise direction, taking what is termed a "hook-in" cut on the work piece 15, or in other words, a cut in the direction in which the table 16 bearing the work is being fed.

As is conventional in machines of this character, the table is provided with a series of dogs, such as 17 and 18, engageable with the trip post 19 for automatic control of rate and direction of movement of the table, and with an additional stop dog 19' engageable with the stop plunger 20 for definitely limiting the movement in both directions. Additionally, there is provided the start and stop lever 21 and the rate and direction determining lever 22.

For effecting actuation of the table, the same has depending therefrom the bracket 23 in which is mounted the stud shaft 24 normally locked against rotation as by nut 25 operating in opposition to shoulder 26 on the shaft, while intermediate said parts and the bracket are the bearings 27 and 28 facilitating rotation of the shaft with respect to the bracket when nut 25 is loosened. This rotation may be effected as by a hand wheel or like device secured to the square end 29 thereof. The inner end of shaft 24 has pinned thereto sleeve 30 which projects longitudinally within the hydraulic cylinder 31 carried by the bed 10 and has secured on its inner end a suitable type of piston 32. The sleeve may, if desired, be internally threaded throughout its length. Preferably, however, it has operative engagement with the control screw 33 by a threaded nut 34 terminally secured to sleeve 30.

Figure 6:
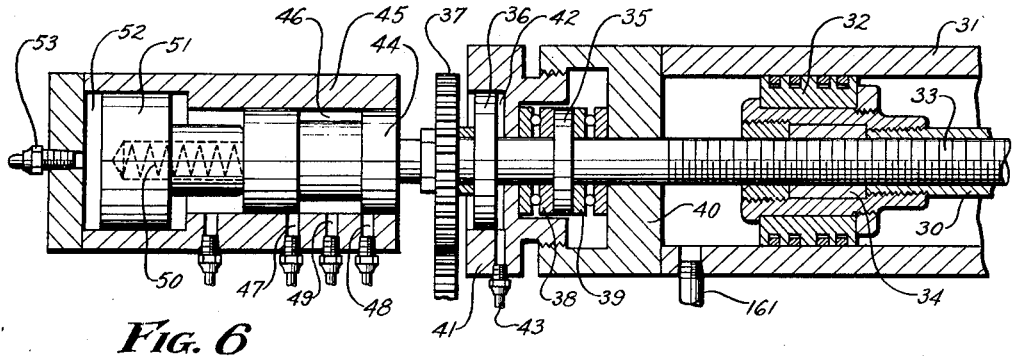
Figure 6 is a fragmentary longitudinal sectional view of the power cylinder and associate parts.

Screw 33 projects from the opposite end of the cylinder 31 from that of which sleeve 30 projects, and exteriorly of the cylinder is provided with a flange portion 35, a piston flange 36 and a driving gear 37. The flange 35 is supported between bearings 38 and 39 in a manner to permit of free rotation thereof and these bearings are preferably so set as to permit of a few thousandths end play of movement between member 35 and the cylinder head 40 which supports the bearings. This head includes a cap member 41 providing the hydraulic chamber or cylinder 42 receiving the piston portion 36 whereby hydraulic pressure may be introduced through conduit 43, urging member 36 to the left, as viewed in Figure 6, taking up any backlash or play between the parts. Exteriorly of gear 37, the terminal portion of screw shaft 33 abuts valve member 44 contained within the valve casing 45. This valve has a central groove or cannelure as at 46 which in neutral position just closes off pressure ports 47 and 48, but which, when displaced in either direction, tends to couple the one or the other of these ports with reservoir connection 49. A spring 50, either alone or acting in conjunction with the hydraulically actuated piston 51 disposed in cylinder 52 and actuable by introduction of pressure through conduit 53, serves to at all times urge member 44 to the right in opposition to any endwise displacement to the left caused by play in member 33, or alternatively to follow up any movement of member 33 toward the right. The employment of the auxiliary hydraulic cylinder 52 in this connection, in place of merely the spring 50, has the added advantage of producing a constant hydraulic urge as it were—dashpot effect, stabilizing the device and eliminating any possibility of a vibrational hunting tendency which might exist in the valve were dependence placed on spring pressure alone and the parts otherwise of high sensitivity.

Figure 8:
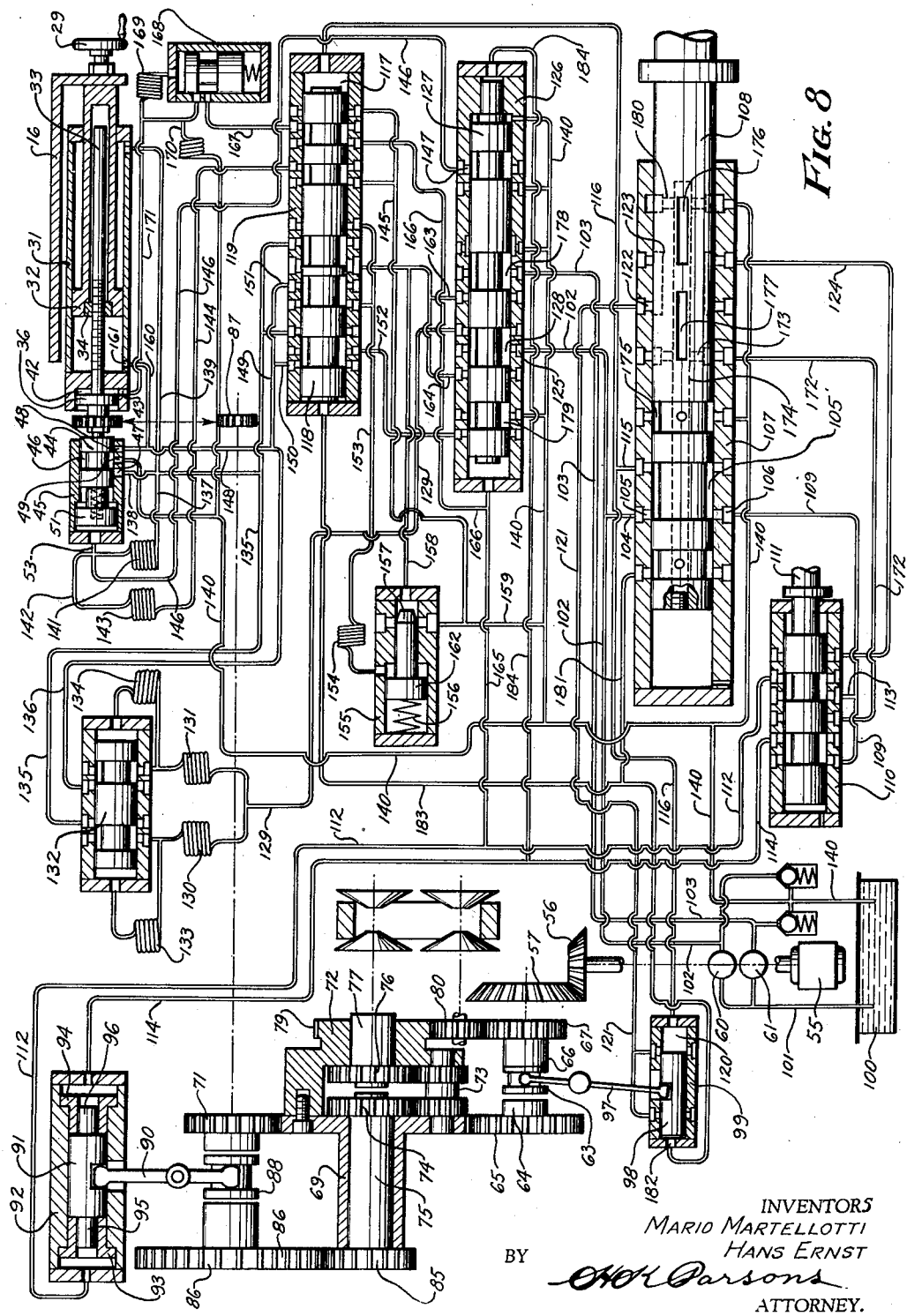
Figure 8 is a diagrammatic view of the hydromechanical drive transmission.

As should be particularly understood by reference to the diagrammatic view in Figure 8, it is the intent of the present invention that the table shall be hydraulically shifted as by control of pressure conditions existing in cylinder 31 at opposite sides of piston 32, while at the same time the rate of such movement is controlled by the nut and screw mechanism 33—34 and its reactance on the valve 44, in connection with the variable controls of the circuit previously referred to for determination of rate and direction of movements.

Figure 5:
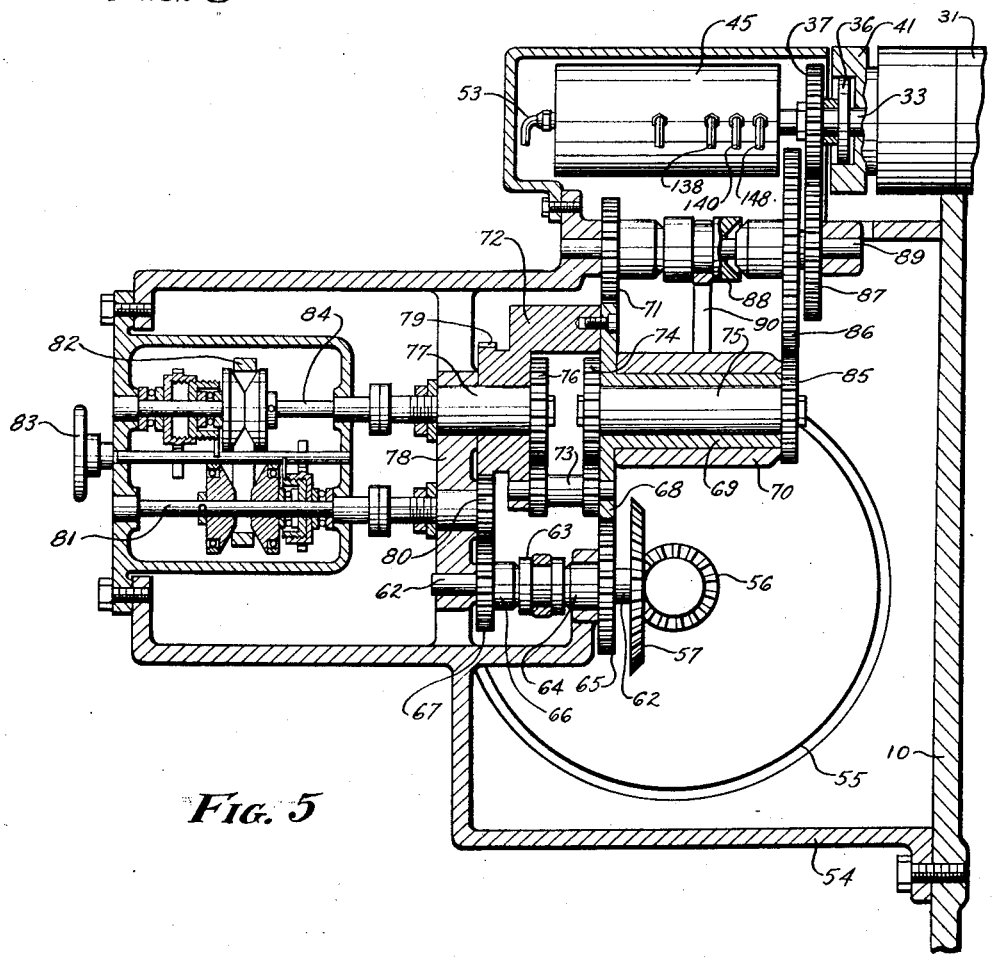
Figure 5 is a vertical sectional view through the gearing mechanism for determination of feed rapid traverse movements of the shiftable element taken substantially on the line 5—5 of Figure 2.

The structure of the mechanical drive for rotation of the screw 33 has been particularly illustrated in Figure 5 of the drawings, reference being also made to the end view of the gearing presented in Figure 2. Secured to the drive box 54 on the end of bed 10 is a drive motor 55 for supplying power to bevel pinion 56 meshing with gear 57 which serves to drive unidirectionally pinion 58 on drive shaft 59 for pumps 60 and 61. This gear 57 also serves to drive shaft 62 having keyed thereon the double cone clutch 63 selectively engageable with hub 64 of gear 65 or hub 66 of gear 67. Gear 65 is in constant mesh with gear 68 having a hub 69 journaled in bearing 70 of the gear box, and ultimately meshes with rapid traverse pinion 71. The rapid traverse drive is thus directly affected from the drive motor through the train 56, 57, 65, 68, 71. The gear 68 additionally carries the planetary drum unit 72 bearing the pinion couplet 73 interiorly meshing with gear 74 on shaft 75 journaled within sleeve 69 and gear 76 on shaft 77 jointly journaled in drum 72 and bearing 78 of the gear box. Exteriorly, drum 72 is further provided with the gear ring 79 meshing with pinion 80 on shaft 81 of the infinitely variable speed drive 82 having a rate variator 83 and having its output shaft 84 coupled with shaft 77. The parts just described form in connection with the planetary gear device 73, 74, 75 and the connecting gear train 85, 86, 87 the feed drive couple to member 37 on screw 33. Determination of the drive couple is effected by the double cone clutch 88 keyed to shaft 89 which supports gears 71 and 86 and is oppositely shiftable directionally to engage and lock one clutch or the other in operative position as by the shifter arm 90 coupled with hydraulically actuable piston 91 disposed in cylinder 92 which has the hydraulic centralizers 93, 94 and the reduced piston portions 95, 96 so that hydraulic movements of the clutch in either position or in a centralized, ineffective position may be produced as desired.

Attention has been invited to the fact that there is also mounted on shaft 62 a gear 67 which also meshes with the pinion 80 on shaft 81, clutch 63 being selectively shiftable for effecting driving of either elements 65 or 67. When the clutch is in driving engagement with hub 66 of member 67, power will be transmitted directly to member 80 in place of indirectly through member 72, but in the opposite direction of rotation. Member 72, however, still continues to effect drive of member 71. In this manner, joint reversal of both feed and rapid traverse drives is effected. This reversal is preferably controlled by a shift lever 97 coupled with hydraulically shiftable piston 98 having two positional movement in cylinder 99 in accordance with the conditioning of the hydraulic system to be hereinafter described. It will thus be seen that the mechanical feed and rapid traverse transmission is itself constantly operated in one direction or the other so long as power is being supplied by the drive motor 55, but that effective coupling for either feed or rapid traverse movements or discontinuance of all movement is determined by hydraulic positioning of clutch 88. It is further to be noted that the controlling clutches in both instances are preferably of the cone type, hydraulically maintainable in effective position but capable of slipping, or discontinuance of drive in event of any failure in the hydraulic system causing undue drop in the actuating pressure, thus automatically providing a safety device for the mechanism.

*The hydraulic system*

The general features of the hydraulic control and actuation system of the machine will now be described in connection with the diagrammatic view, Figure 8, first as to the conduits themselves and their conditioning as illustrated in said figure and subsequently the variance in conditioning of the conduits effectable by different positionings of the several valve elements. As has been mentioned, power is supplied for actuation of the feeding pump 60 and rapid traverse additive pump 61 as from the motion drive motor 55. These pumps deliver fluid from reservoir 100 as through the common intake 101 and discharge into the respective pressure conduits 102 and 103. Pressure conduit 102 may in the first instance be considered as extending via conduit 104, ports 105, 106 of casing 107 for pilot valve 108 and conduit 109 through casing 110 of stop valve 111, conduit 114 to the right hand end of feed-rapid traverse selector 91. At the same time, however, conduit 109 through branch 113 and casing 110 of stop valve 111 introduces pressure into line 112, coupled to the opposite end of the casing for selector piston 91 with the result that the piston—as shown in Figure 8, is moved and maintained in a centralized position interrupting both the potential feed and rapid traverse drives to screw 33.

At the same time, conduit 104 is coupled by cannelure 105' with branch conduit 115 and thus to 116, which as it extends in a right hand direction, introduces pressure into the pilot chamber 117 for shifting reverse valve 118 to the left in its bushing or casing 119. At the same time, conduit 116, in its left hand extent, couples with the right hand chamber 120 moving the reversing piston 98 to the left as there shown. It will thus be seen that the reverse valve for control of hydraulic actuating fluid to the table controlling cylinder and the reverser for the mechanical transmission are employed for joint corresponding actuation. As the piston 98 completes its left hand movement, the pressure from line 116 flows by way of conduit 121, to port 122 of the pilot valve bushing 107. In the position of the valve shown, it is then coupled by way of groove 123 and conduit 124 to stop valve 111 where—with the valve in stop position—its further flow is prevented.

Pressure line 102 is also coupled to port 125 of bushing 126 for the feed rapid traverse selector valve 127, shown in Figure 8 in a feed position. At this time pressure fluid is coupled via cannelure 128 with conduit 129 extending through the branch resistances 130 and 131 to flow-dividing valve 132. Branch resistances 133 and 134 reacting on the terminal portions of this valve serve to maintain prescribed pressures in the piston actuating lines 135 and 136. Conduit 135 has a three-way branch portion including the conduits 137, 138 and 139, conduit 139 being directly associated at all times with the right hand end of cylinder 31, tending to urge piston 32 and thus table 16 to the left. Conduit 138 is coupled with port 47 of valve casing 45 so that displacement of valve 44 to the left permits of relief of pressure by way of cannelure 46, port 49 and conduit 140 to reservoir. Branch 137 extends through resistance 141 to conduit 53 for exerting hydraulic resistance against the valve piston 51 as previously described and further continues through portion 142, resistance 143, conduit 144, reversing valve 118 and conduit 145 to reservoir connection 140. The pressure also has the capacity for flow through conduit 146 and groove 147 of the feed rapid traverse valve; this flow, however, being blocked in the position of parts shown in Figure 8.

The second pressure conduit 136 divides into branch conduits 148 and 149, conduit 148 coupling with inlet 48 of valve casing 45 similarly to conduit 138, but oppositely controllable by movements of valve 44. Its other branch 149 is coupled at 150 and 151 with the reverse valve having a potential but, as shown, blocked outflow from the feed rapid traverse valve through conduit 152 and a second flow connection through the reverse valve, conduit 153 and resistance 154 to the differential valve 155 where the pressure acts in opposition to spring 156 for determining the position of the valve 157, controlling the discharge from line 158 to reservoir connection 159.

Conduit 148 also has a portion 160 coupled with inlet 161 for the left hand end of the table control cylinder. Consequently when feeding to the left the reaction in the pressure line 136 against the piston portion 162 of the differential valve 155 in conjunction with the reaction against its reduced terminal portion by the pressure from conduit 158 determines the relative unit pressures in the two ends of the cylinder, so that the piston 32 is at all times hydraulically locked against movement other than that permitted by exhaust from or introduction of additional fluid into one end or the other of the piston.

It will be noted that coupled with the pressure line 158 are a pair of branch lines 163 and 164, leading to the bushing of the feed rapid traverse valve but shown as blocked or ineffective in Figure 8.

From the immediately preceding description the general neutral or stop position and feed left couplings of the hydraulic circuit comprising the constant pressure couplings to opposite ends of cylinder 31, together with the oscillatable valve 44 permitting a reservoir bleed from one or the other of the pressure lines and a consequent movement of the piston in one direction or the other, should be understood.

Control circuits

The general control lines 112 and 114 which are jointly coupled with pressure from line 109 by the stop valve in its stop position have been previously referred to. The line or conduit 112 to the left hand end of the cylinder 92 may be considered the feed circuit in that when pressure is introduced through this line only with line 114 connected to reservoir, member 91 will be shifted to the right, thus to rocking shift lever 90 and bringing clutch 88 into driving engagement with feed transmission gear 86. This is the result which will be effected when the stop valve is moved from the position shown in Figure 8 toward the right to start up operation of the machine. At the same time, pressure in line 112 continues to react through line or conduit 165, holding the feed rapid traverse valve 127 to the right as indicated in Figure 8. This pressure also reacts through continuation 166 of line 165 by way of reverse valve 118 and conduit 167 to the pressure limiting valve 168 which, through resistance 169 and reservoir bleed 170, determines pressure in line 171 coupled to chamber 42 containing the piston element 36 for urging same toward the left or in the direction of feed, so that any possible backlash or play between screw 33 and nut 34 is fully taken up and the pressure reaction of the terminus of the screw against valve 44 tends slightly to anticipate the piston movement.

It is to be understood that the introduction of pressure into line 112 is determined by the positionings of the pilot valve 108 which, as previously described, is operable either by direct movement of lever 22 or automatically by action of dogs 17 on plunger 18. The couple by which this is effected is of conventional type as illustrated in Figure 3, up and down movements of the plunger or handle serving to impart rotary movements to the pilot valve and oscillations of the plunger or reciprocations of the lever imparting longitudinal movements thereto.

As previously described, with the valve in the position shown in Figure 8, pressure is coupled by way of 104, 105, 115, 120, 121, 122—124 to the stop valve, having caused actuation of the reverser clutch in a direction to cause movement to the left and of the reverser valve to the left hand position as shown in Figure 8, conditioning the hydraulic power circuits for feed in that direction. As the stop valve is in running position, pressure conduit 124 will be coupled with conduit 112, whereupon the selection and coupling of mechanical feed and feed setting of valve 127, in the event they are not already in this location, will be effected subsequent to the directional determination. To permit or facilitate these movements the conduit 114 is coupled through the stop valve with conduit 172, which through radial port 173, axial passage 174 and groove 175 of pilot valve 108 couples these ports with reservoir connection 140.

When it is desired to change from feed left to rapid traverse left, pilot valve 108 is rotated, groove 176 then coupling conduit 124—112 to reservoir and groove 177 of pilot valve 108, coupling 172—114 to pressure causing reversal of position of the feed rapid traverse valve and mechanical selector.

Upon this movement of the rapid traverse valve, conduit 102 formerly coupled therethrough to conduit 129 to the flow-dividing valve, is now coupled direct with branch 164 of the pressure circuit 135—139 to the right hand end of the cylinder 31. At the same time, the rapid traverse additive pump circuit 103 is coupled by cannelure 178 with branch 163 so that the flow of pump 61 is additive to pump 60 and all directed into the cylinder for effecting rapid movement of the table. At the same time, to facilitate this movement the formerly blocked conduit 152 from the left hand end of the cylinder is coupled through the feed rapid traverse valve cannelure 179 to the general reservoir connection 140.

Inasmuch, however, as oscillation of valve 108 does not affect the port connection 104—105—115, the reverse valve will be maintained in its previous setting and no change of direction effected.

If a change of both rate and direction is desired, valve 108, in place of being oscillated, would be reciprocated or longitudinally shifted to the left. By this movement from the Figure 8 position, conduit 124 would be connected to reservoir via radial port 180 of valve 108 and 172 will be coupled to 121 via groove 123. Pressure from conduit 102 will be directed through 104 and the adjacent cannelure of valve 108 to line 181 coupled with the left hand end of cylinder 99 as at 182 for effecting reversal of the mechanical transmission; while at completion of movement of the mechanical transverser the pressure will then flow back through 121 into conduit 172 through the stop valve to 114, shifting the mechanical clutch to a rapid traverse position. Prior thereto, the pressure in 181 will extend through branch 183 to the left hand end of valve 118, effecting its reversal; while concurrently with the introduction of pressure into line 114 the branch 184 to the piston at the right hand end of the feed rapid traverse selector valve will be energized, causing a shifting of this valve to the left for effecting rapid traverse connections as previously described, but in the opposite direction, due to the difference in positioning of the reverser valve.

Hydraulic summary

From the foregoing it will be seen that the present invention embodies a series of hydraulic control circuits including a power circuit which is divided and during feeding movements is coupled with both ends of the table translating cylinder and operates in conjunction with a servo-type mechanism, bleeding fluid from one or the other of the circuits to determine the extent of actuation of the table. Secondly, there are a pair of direction control circuits, each jointly effective on a mechanical reverser for the mechanical control mechanism, and simultaneously on the reverse valve controlling the directional actuation effected by the power circuit. Thirdly, there are a pair of oppositely acting rate determining or feed rapid traverse selecting circuits, serially arranged with respect to the direction determining circuits for operation subsequent to the functioning of the direction controlling means, these circuits serving to shift a selector clutch for feed or rapid traverse coupling of the mechanical transmission and concurrently therewith to shift the feed rapid traverse valve for control both of the initial power circuit and additively couple an additional pump therewith for rapid traverse actuation of the table piston in the direction determined by the reversing mechanism.

It will additionally be noted that there has been provided a four-position pilot valve for selective coupling of a source of hydraulic pressure which may be derived from either the same or a different source from that which the actuating pressure is derived, which pilot valve determines the effective coupling of the several circuits previously referred to for actuation of the hydraulic and mechanical controls.

Additionally, it is to be noted that there has been provided a stop valve and series of hydraulic couplings therewith and therefrom, such that when this valve is moved to a stop position it causes movement of one of the mechanical clutch elements into a neutral position, interrupting motion transmission through either the feed or rapid traverse trains and, at the same time, shifts the feed rapid traverse valve into a feed position, causing a hydraulic locking of the table piston against either overrun from inertia or from action of the clockwise rotating cutter.

Feed rate control

As distinguished from prior types of hydraulically operated milling machines or like machine tools in which the feeding rate of a translatable part is determined by control either of the quantity of hydraulic medium which is metered into the pushing end of a hydraulic motor, or alternatively, control is effected by metering out fluid from the exhaust or output end of the motor as by an adjustable throttle, metering device or the like, the present system contemplates the utilization of a mechanical rate determinator for control of the effects of the hydraulic pressure medium.

The structural features of this determinator have previously been described. Briefly, they comprise a prime mover or source of power, a set of reduction gearing therefrom including a variable rate determinator and a subsequent final drive through a friction coupling mechanism to a screw threaded member maintained by antifriction bearings in substantially fixed relation to the bed or support on which the translatable member moves and having threaded engagement with the translatable piston. As this member is rotated at a prescribed rate, as determined by its variable speed transmission—in the event that a feed toward the left as viewed in Figures 1 and 6, for example, is to be effected, it is rotated in a clockwise direction, to move the screw into the piston against the pressure in chamber 42. The slightest variant in endwise position thus produced, as for example, .0001 or .0002", will be sufficient slightly to relieve the retaining pressure on valve 44 which under the influence of pressure in chamber 52 and of the spring 50, will tend to move toward the right. Such movement slightly increases the capacity for flow of pressure fluid from conduit 148 by way of port 48 to port 49 of exhaust connection 140, thus slightly decreasing the unit pressure in the left hand end of cylinder 31, while more tightly closing off any flow from 135 to the reservoir connection producing tendency to a concomitant building up of pressure in the right hand end of the cylinder. So long as the screw member is rotated in a clockwise direction, as described, it will cause a maintenance of this condition of pressure flows, and therefore, a hydraulically effected rate of movement of the piston in accordance with the rate of rotation and pitch of the thread.

At the same time, any stoppage in rotation of the screw will allow the movement of the piston to catch up, as it were, and the effect of the pressure condition in the right hand end of the cylinder plus the existing pressure urge in chamber 42 against flange 36 will tend to impart a slight bodily movement of the parts to the left, thus reversely actuating valve 44, impounding the pressure in conduit 136—144, stopping movement of the piston while tending to relieve actuating pressure by allowing a percentage of flow from conduit 135 to reservoir through conduit 140.

It is, of course, evident that on rotation of screw 33 in the opposite direction, through shifting of reverse clutch 63, that the opposite action will take place as to anticipation of positive movement by valve 44 and the rate of feed in the opposite direction equally, positively controlled. Similarly, when rapid traverse movement is to be effected, the screw is rotated at a rapid rate to prevent undue mechanical reciprocation on the rapid movement of the table, the friction clutch coupling of the rapid traverse and directional drives permitting a slippage in the mechanical system in the event of any tendency of the screw to overrun the piston movement, while, as previously described, the hydraulic valve connections are such that in this event valve 44 is preferably relieved of any control and the exhaust fluid is discharged direct to reservoir.

It will be noted that the foregoing hydraulic control system is particularly efficient in connection with what are known as hook-in cut operations, that is to say, in which the cutter—as shown in Figure 1—operates in the direction of feed of the work in that valve 44 normally impounds the back pressure fluid, preventing movement of the table to the left and the potential endwise play of the screw member is taken up by the action of piston 36 in the feeding direction so that it is only when the wind-up of the screw with complete elimination of backlash is sufficient to counteract the pressure in chamber 42 and any possible looseness of piston movement without a cracking of the valve is effected, permitting advance of the table while the slightest tendency of table to overrun or accelerate with respect to the prescribed rate immediately closes up the opening that is provided, while effecting a drop in the pressure condition on the actuating side of the piston.

It will, of course, be noted that for movement in the opposite direction, pressure chamber 52 is effective in urging the valve and thus the screw to the right, while the reversal in opposition of the reverse valve couples conduit 171 from chamber 42 to reservoir so that again the anticipation is in the direction of feed movement, and any tendency toward acceleration immediately locks up the exit line from the cylinder.

What is claimed is:

1. A hydro-mechanical transmission for control of a translatable element of a machine tool comprising a hydraulic motor including relatively movable cylinder and piston parts, one of which is coupled with the translatable element, means for producing a hydraulic pressure urge in the cylinder at opposite sides of the piston, a servo-valve for determining relative pressure conditions in opposite ends of the cylinder, a rate determinator coupled with the translatable element and actuable relative thereto in a direction opposite the desired direction of actuation of the translatable element, and means for effecting movement of the servo-valve in accordance with the differential between the opposite movements of the rate determinator and translatable element.

2. A hydraulic control mechanism for a translatable machine tool element, including a reciprocating hydraulic motor having a stationary part and a translatable part, a rate determinator including an element bodily movable with and relative to the translatable part of the hydraulic motor, means for creating a hydraulic pressure within the hydraulic motor, means for driving the rate determinator at selectively variable rates, an impounding valve for the exhaust of the hydraulic motor, and connections between the impounding valve and the rate determinator for variably positioning the former in accordance with relative longitudinal movements of said determinator and the translatable part of the motor.

3. A hydraulic control mechanism for a translatable machine tool element, including a reciprocating hydraulic motor having a stationary part and a translatable part, a rate determinator including an element bodily movable with and relative to the translatable part of the hydraulic motor, means for creating a hydraulic pressure within the hydraulic motor, means for driving the rate determinator at selectively variable rates, an impounding valve for the exhaust of the hydraulic motor, connections between the impounding valve and the rate determinator for variably positioning the former in accordance with relative longitudinal movements of said determinator and the translatable part of the motor, means for effecting reciprocations of the hydraulic motor including a hydraulic circuit having separate pressure conduits employed with opposite ends of the motor, and valve means for reversing the effect of said connections as respects the impounding valve.

4. A hydraulic control mechanism for a translatable machine tool element, including a reciprocating hydraulic motor having a stationary part and a translatable part, a rate determinator including an element bodily movable with and relative to the translatable part of the hydraulic motor, means for creating a hydraulic pressure within the hydraulic motor, means for driving the rate determinator at selectively variable rates, an impounding valve for the exhaust of the hydraulic motor, connections between the impounding valve and the rate determinator for variably positioning the former in accordance with relative longitudinal movements of said determinator and the translatable part of the motor, means for effecting reciprocations of the hydraulic motor including a hydraulic circuit having separate pressure conduits employed with opposite ends of the motor, and valve means for simultaneously short-circuiting the impounding valve and coupling both pressure lines to one side only of the motor.

5. A hydraulic control mechanism for a translatable machine tool element, including a reciprocating hydraulic motor having a stationary part and a translatable part, a rate determinator including an element bodily movable with and relative to the translatable part of the hydraulic motor, means for creating a hydraulic pressure within the hydraulic motor, means for driving the rate determinator at selectively variable rates, an impounding valve for the exhaust of the hydraulic motor, connections between the impounding valve and the rate determinator for variably positioning the former in accordance with relative longitudinal movements of said determinator and the translatable part of the motor, means for effecting reciprocations of the hydraulic motor including a hydraulic circuit having separate pressure conduits employed with opposite ends of the motor, valve means for simultaneously short-circuiting the impounding valve and coupling both pressure lines to one side only of the motor, and additional valve means for coupling the joint pressure lines selectively to either side of the motor.

6. A hydro-mechanical control for a translatory element of a machine tool including a reciprocating hydraulic motor, an operating hydraulic circuit including conduits coupled with opposite ends of the motor for introduction of hydraulic medium under pressure thereinto, a hydraulic rate control valve, a mechanical determinator for continuous positioning of said valve including a variable speed transmission, a hydraulically controllable reverser for said transmission, an independent reverse valve for controlling the coupling of the hydraulic pressure medium to the conduits at opposite ends of the motor, and a hydraulic control circuit including a pilot valve for effecting simultaneous actuation of the mechanical reverser and the hydraulic control valve.

7. In a machine tool having a cutter support and a work support, the combination of transmission means for effecting relative movement between the supports including a hydraulic piston operatively connected to the translatable support, a pair of pressure lines for supplying fluid to opposite ends of the piston, a valve connected across said lines, a screw threaded in said piston and engaging the end of the valve, means to effect rotation of the screw to cause shifting of the valve to connect one of said lines to reservoir and thereby create a pressure differential in opposite sides of said piston to produce movement of the support, said piston movement being in a direction to effect bodily movement of the screw opposite to its first direction of movement, thereby closing the reservoir connection and re-establishing equilibrium on opposite ends of the piston.

8. In a machine tool having a cutter support and a work support, the combination of transmission means for effecting relative movement between the supports including a hydraulic piston operatively connected to the translatable support, a pair of pressure lines for supplying fluid to opposite ends of the piston, a valve connected across said lines, a screw threaded in said piston and engaging the end of the valve, means to effect rotation of the screw to cause shifting of the valve to connect one of said lines to reservoir and thereby create a pressure differential in opposite sides of said piston to produce movement of the support, said piston movement being in a direction to effect bodily movement of the screw opposite to its first direction of movement, thereby closing the reservoir connection and re-establishing equilibrium on opposite ends of the piston, a pump and a flow-dividing valve for connecting the delivery of said pump to said lines for maintaining a desired division of flow from the pump among said lines.

9. In a machine tool having a work support and a tool support, the combination of transmission means for effecting relative movement between the supports including a piston operatively connected to the moving support, a pair of channels for supplying fluid to opposite sides of the piston, a valve for controlling the pressures in said channels, a screw interposed between the valve and the piston and threaded into the latter, power operable means for rotating said screw to cause movement of the valve relative to the piston whereby unequal opposing pressures will be created on the piston to cause movement of the support, said power means including a hydraulically shifted reversing clutch, a pilot circuit therefor, and a pilot valve trip operable by the work support to effect shifting of said clutch and thereby an opposite direction of rotation of said screw and a reversal in the direction of movement of the work support.

10. In a milling machine having a cutter support and a work table, the combination of means for translating the table relative to the cutter support including a piston operatively connected to the table, a pair of channels for simultaneously supplying fluid under pressure to opposite ends of said piston, a valve for by-passing fluid from either of said channels to reservoir to create a pressure differential on said piston, a screw interposed between the valve and piston, said screw being threaded in one of said members whereby upon relative rotation of the screw the valve will be caused to move, a power operable mechanical transmission for effecting rotation of the screw at various feed rates and at a rapid traverse rate, a reversing clutch and a rapid traverse clutch in said mechanical transmission, a pilot control circuit for said clutches, including a pilot valve selectively operable by the table to produce different position combinations of said clutches, a first supply pump continuously connected to said channels, a second pump, a valve means adapted to be hydraulically positioned by said pilot valve, simultaneously with the positioning of said clutches in a rapid traverse position for connecting said second pump to increase the flow in one of said channels.

11. In a milling machine having a cutter support and a work table, the combination of means for translating the table relative to the cutter support including a piston operatively connected to the table, a pair of channels for simultaneously supplying fluid under pressure to opposite ends of said piston, a valve for by-passing fluid from either of said channels to reservoir to create a pressure differential on said piston, a screw interposed between the valve and piston, said screw being threaded in one of said members whereby upon relative rotation of the screw the valve will be caused to move, a power operable mechanical transmission for effecting rotation of the screw at various feed rates and at a rapid traverse rate, a reversing clutch and a rapid traverse clutch in said mechanical transmission, a pilot control circuit for said clutches, including a pilot valve selectively operable by the table to produce different position combinations of said clutches, a first supply pump continuously connected to said channels, a second pump, a valve means adapted to be hydraulically positioned by said pilot valve, simultaneously with the positioning of said clutches in a rapid traverse position for connecting said second pump to increase the flow in one of said channels, and a reversing valve also positionable by said pilot valve for determining which of said channels said additional flow shall be delivered to.

MARIO MARTELLOTTI.
HANS ERNST.